(12) United States Patent
Achard et al.

(10) Patent No.: US 8,827,631 B2
(45) Date of Patent: Sep. 9, 2014

(54) TURBINE ENGINE WITH TRANSVERSE-FLOW HYDRAULIC TURBINE HAVING REDUCED TOTAL LIFT FORCE

(75) Inventors: Jean-Luc Achard, Grenoble (FR); Didier Imbault, Meylan (FR); Ali Tourabi, Eybens (FR)

(73) Assignees: Institute Polytechnique de Grenoble, Paris (FR); Electricite de France, Paris (FR)

( * ) Notice: Subject to any disclaimer, the term of this patent is extended or adjusted under 35 U.S.C. 154(b) by 1174 days.

(21) Appl. No.: 12/738,675

(22) PCT Filed: Oct. 23, 2008

(86) PCT No.: PCT/FR2008/051917
§ 371 (c)(1),
(2), (4) Date: Sep. 15, 2010

(87) PCT Pub. No.: WO2009/056742
PCT Pub. Date: May 7, 2009

(65) Prior Publication Data
US 2011/0006534 A1    Jan. 13, 2011

(30) Foreign Application Priority Data
Oct. 23, 2007    (FR) ..................................... 07 58511

(51) Int. Cl.
*F03B 13/10*        (2006.01)
*F03B 17/06*        (2006.01)

(52) U.S. Cl.
CPC ............... *F03B 17/063* (2013.01); *Y02E 10/28* (2013.01); *F05B 2240/93* (2013.01); *Y10S 415/907* (2013.01)
USPC .............................. 415/4.2; 415/60; 415/907

(58) Field of Classification Search
USPC ............. 415/3.1, 4.1, 4.2, 4.5, 7, 60, 62, 906, 415/111, 120, 227 A, 227 R; 290/43, 54, 55; 416/111, 120, 227 A, 227 R
See application file for complete search history.

(56) References Cited

U.S. PATENT DOCUMENTS 950,676 A        3/1910    Price
4,095,422 A  *    6/1978    Kurakake ........................ 60/398
(Continued)

FOREIGN PATENT DOCUMENTS

CA        2484293 A1    5/2006
FR         506199 A    8/1920
(Continued)

OTHER PUBLICATIONS

International Preliminary Report on Patentability issued in PCT/FR2008/051917 on Jun. 1, 2010.

(Continued)

*Primary Examiner* — Edward Look
*Assistant Examiner* — Maxime Adjagbe
(74) *Attorney, Agent, or Firm* — Veddêr Price PC (57) ABSTRACT

The invention relates to a turbine engine that includes at least first and second lift turbine stacks with transverse flow. The shafts of adjacent turbines in the first stack are connected by a first coupling device adapted for compensating space misalignments, and the shafts of adjacent turbines in the first stack are connected by a second coupling device adapted for compensating for space misalignments. The turbine engine includes a device for supporting the first and second turbine stacks, which is symmetrical to said plane, and a control device adapted for permanently maintaining the symmetry between the first and second turbine stacks relative to the plane, and for maintaining the rotation speeds of the first and second turbine stacks at equal values in opposite rotation directions.

11 Claims, 6 Drawing Sheets

(56) References Cited

U.S. PATENT DOCUMENTS

| | | | | |
|---|---|---|---|---|
| 4,203,702 | A | * | 5/1980 | Williamson .................... 415/60 |
| 5,062,765 | A | * | 11/1991 | McConachy .................. 415/4.3 |
| 7,679,209 | B2 | * | 3/2010 | Rashidi ........................... 290/55 |

FOREIGN PATENT DOCUMENTS

| | | |
|---|---|---|
| FR | 2865777 A | 8/2005 |
| WO | 2007/009155 A | 1/2007 |
| WO | 2007/027113 A | 3/2007 |

OTHER PUBLICATIONS

International Search Report issued in PCT/FR2008/051917 on Jun. 23, 2009.

* cited by examiner

TURBINE ENGINE WITH TRANSVERSE-FLOW HYDRAULIC TURBINE HAVING REDUCED TOTAL LIFT FORCE

FIELD OF THE INVENTION

The present invention relates to a water turbine engine and in particular to a water turbine engine for the recovery and the conversion of kinetic energy of sea or river currents, especially to provide electricity.

DISCUSSION OF PRIOR ART

Among clean natural sources of energy, a currently underexploited source of energy corresponds to water currents naturally present around the world: open sea currents, tidal currents, strait and estuary currents, river currents. Indeed, if hydroelectric plants providing electric power from the potential energy contained in impoundments (for example, dams on rivers) are widely spread, devices providing electric power directly from the kinetic energy of sea or river currents are generally still at the stage of draft.

Although the sites that could be used to provide electric power from sea or river currents generally correspond to low current velocities, from 0.5 m/s to 6 m/s, the size of the sites and the large number of potential sites make such a source of energy particularly attractive. Indeed, from rivers to large ocean currents, the exploitable surface areas crossed by a current typically vary from 100 m$^2$ to 100 km$^2$, which corresponds, for a 2 m/s speed, to theoretically recoverable powers ranging from 400 kilowatts to 400 gigawatts.

Devices for recovering and converting the kinetic energy of sea or river currents generally comprise a turbine comprising an assembly of blades adapted to rotate a shaft when they are immersed in the current. Among the different types of turbines, one can distinguish axial flow turbines for which the flow direction is parallel to the rotation axis of the turbine and cross-flow turbines for which the flow direction is inclined, and generally perpendicular with respect to the rotation axis of the turbine.

To operate, certain cross-flow turbines use the lift forces exerted by the current on the blades which then have, for example, a foil profile to drive the rotation axis. Turbines for which the rotation is essentially due to the lift forces exerted by the flow on the turbine blades will be called lift turbines. Such is especially the case for cross-flow turbines of Darrieus or Gorlov type, or turbines of the type described in European patent application EP1718863 filed by the Applicant.

A general feature of water turbines is the presence of a total lift force perpendicular to the rotation axis of the turbine and to the upstream flow direction. Indeed, the rotation of the blades around the rotation axis of the turbine considered as a whole induces a rotary motion of the liquid around the turbine, which superposes to the incident motion perpendicular to the rotation axis. This conventionally results, like for a rotating cylinder immersed in an incident current perpendicular to the cylinder axis, in a lift force, called total lift, ultimately exerted on the rotation turbine axis and thus perpendicular to the flow direction and to the rotation axis. The total lift is always present, independently from the cause of the turbine rotation, that is, in the case of certain cross-flow turbines, independently from the fact that the rotating of the turbine shaft is due to local lift forces at the level of each blade. Conversely to what can be observed with a rotating cylinder having a very even surface, the total lift observed on a conventional turbine tends to vary around an average value. The fluctuations observed around this average value are periodically repeated on each 360° rotation of the turbine. The device for holding the turbine and possibly the system for anchoring the turbine to the ground must then be designed to resist the total lift force, in addition to the drag force. Further, the turbine engine as a whole, that is, comprising the system of conversion of the mechanical power provided by the turbine shaft, must withstand the fatigue caused by vibrations induced by the variable total lift.

This problem is even more acute when several turbines are connected to one another to increase the recovered powers.

International patent application WO200704581 describes a wind turbine engine comprising several wind turbines connected to a mast. The wind turbines are not interconnected and operate independently. Such a turbine engine is not usable in the construction of a water turbine engine, given that lift forces are much stronger in a moving liquid.

SUMMARY OF THE INVENTION

An aspect of the present invention aims at a cross-flow turbine engine for which, in operation, the general transverse lift applied to the turbine engine holding devices is substantially null.

An embodiment provides a turbine engine comprising at least first, second, third, and fourth lift-type cross-flow water turbines, the first turbine comprising a first rotation shaft, the second turbine comprising a second rotation shaft, the first and second turbines being symmetrical to each other with respect to a plane, the third turbine comprising a third rotation shaft connected to the first rotation shaft by a first coupling device capable of compensating for spatial misalignments between the first and third rotation shafts, the third turbine forming, with the first turbine, a first stack of turbines, the fourth turbine comprising a fourth rotation shaft connected to the first rotation shaft by a second coupling device capable of compensating for spatial misalignments between the second and fourth rotation shafts, the third and fourth turbines being symmetrical to each other with respect to said plane, the fourth turbine forming, with the second turbine, a second stack of turbines. The turbine engine further comprises a device for holding the first and second turbine stacks, comprising a single vertical member symmetrical with respect to said plane or vertical members, each of said vertical members being symmetrical with respect to said plane and/or said vertical members being arranged symmetrically with respect to said plane, the holding device further comprising first and second plates symmetrical with respect to said plane, at least partly perpendicular to said plane, and arranged between the first and third turbines and between the second and fourth turbines, the first and second rotation shafts being pivotally connected to the first plate and the third and fourth rotation shafts being pivotally connected to the second plate. The turbine engine further comprises a control device capable of permanently maintaining the symmetry between the first and second turbine stacks with respect to said plane and of maintaining the rotation speeds of the first and second turbine stacks of equal values and of opposite rotation directions when the first and second turbine stacks are immersed in a moving liquid.

According to an embodiment of the present invention, at least one vertical member symmetrical with respect to said plane extends upstream of the first and second turbine stacks with respect to the liquid flow direction and forms a stem. The first turbine comprises first blades connected to the first rotation shaft. The second turbine comprises second blades connected to the second rotation shaft. The third turbine comprises third blades connected to the third rotation shaft. The fourth turbine comprises fourth blades connected to the fourth rotation shaft. The control device is capable of rotating the first, second, third, and fourth turbines so that the first, second, third, and fourth blades move up the flow of said liquid when they are closest to said plane.

According to an embodiment of the present invention, at least one vertical member extends downstream of the first and second turbine stacks with respect to the liquid flow direction and forms a tail vane.

According to an embodiment of the present invention, the first and second turbine stacks are capable of driving an input shaft of a single power recovery system via a transmission device or the first turbine stack is capable of driving an input shaft of a first power recovery system, the second turbine stack being capable of driving an input shaft of a second power recovery system.

According to an embodiment of the present invention, the turbine engine comprises at least two lateral vertical members arranged symmetrically with respect to said plane and forming at least one divergent section along the flow direction, the first and second turbine stacks being arranged between the lateral vertical members.

According to an embodiment of the present invention, the first and second plates are capable of separating the moving liquid between the first and third turbines and between the second and fourth turbines. At least the first turbine comprises first blades connected to the first rotation shaft. The holding device comprises at least one portion arranged in front of first tips of the first blades.

According to an embodiment of the present invention, the turbine engine comprises an anti-debris device comprising parallel bars and/or rods connected to at least one vertical member and at least partially surrounding the first and second turbine stacks.

According to an embodiment of the present invention, the turbine engine comprises a system capable of pivoting the first and second turbine stacks in the moving liquid.

According to an embodiment of the present invention, at least the first turbine comprises first blades connected to the first rotation shaft. The tips of the first blades are connected by a first ring rotating along with the first blades.

According to an embodiment of the present invention, the first turbine comprises first blades connected to the first rotation shaft. The second turbine comprises second blades connected to the second rotation shaft. The third turbine comprises third blades connected to the third rotation shaft. The fourth turbine comprises fourth blades connected to the fourth rotation shaft, the first blades being symmetrical to the second blades with respect to said plane, the third blades being symmetrical to the fourth blades with respect to said plane. The first blades are, in top view, angularly offset with respect to the third blades.

According to an embodiment of the present invention, at least one vertical member corresponds to a hollow cavity, the turbine engine further comprising means for filling or emptying, at least partially, the cavity with liquid.

According to an embodiment of the present invention, at least one of the lateral vertical members comprises at least one slot extending along the liquid flow direction.

BRIEF DESCRIPTION OF THE DRAWINGS

The foregoing objects, features, and advantages of the present invention, as well as others, will be discussed in detail in the following non-limiting description of specific embodiments in connection with the accompanying drawings, among which.

DETAILED DESCRIPTION

For clarity, the same elements have been designated with the same reference numerals in the different drawings.

In the rest of the description, an elementary cross-flow turbine comprising a rotation shaft and means capable of rotating the shaft when these means are immersed in a liquid moving along a direction approximately perpendicular to the axis of the rotation shaft is called turbine unit.

Figure 1:
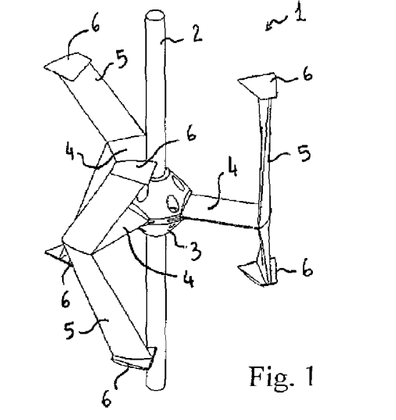
FIG. 1 is a perspective view of a conventional embodiment of a turbine unit.

FIG. 1 shows an embodiment of a lift-type turbine unit 1, which corresponds to one of the embodiments described in European patent application EP1718863 filed by the Applicant. As an example, turbine unit 1 comprises a rotation shaft 2 and a hub 3 secured to rotation shaft 2 and from which arms 4 extend. Each arm 4 supports a foil 5 (or blade) at its end opposite to hub 3. Each foil 5, for example, V-shaped, may comprise winglets 6 at its ends.

A stack of several turbine units having their rotation shafts connected to one another and substantially aligned is called a turbine column. The assembly formed of a turbine column and of the device for holding the turbine column is called a tower. The assembly of two adjacent turbine units having substantially parallel and separate rotation axes is called a turbine unit pair. The assembly formed by a turbine unit pair and the associated holding device is called a turbine engine pair.

Call L1 a line parallel to the average velocity vector upstream of the liquid flow to which the pair of turbine engines is exposed, and equidistant to the rotation axes of the turbine units of the turbine engine pair. Call P1 the plane containing line L1 and parallel to the rotation axes of the turbine units. Plane P1 is thus equidistant from the rotation axes of the turbine units of the turbine engine pair. Call P2 the plane containing the rotation axes of the turbine units of the turbine engine pair. The reunion of two turbine units respecting the symmetry with respect to plane P1 is called a symmetrical turbine unit pair, said plane then being called the median plane of the symmetrical pair. The assembly formed by a symmetrical turbine unit pair and the device for holding the turbine units of the turbine unit pair is called a symmetrical turbine engine pair, or twin turbine engines, the holding device being itself symmetrical with respect to plane P1. The assembly formed of the stacking of several turbine engine pairs, the turbine units of the turbine engine pairs being interconnected to form two turbine columns, is called a tower pair. The assembly formed of the stacking of several symmetrical pairs of turbine engines is called a symmetrical tower pair, or twin towers.

The present invention aims at a symmetrical tower pair formed of a stacking of symmetrical turbine engine pairs. Each symmetrical turbine engine pair comprises a device for holding at least one lift-type cross-flow turbine unit pair in which the turbine units rotate in reverse directions at the same rotation speed. This results in canceling, by the addition of the load balance within and at the level of the holding devices, the two equal and opposite total lift forces, perpendicular to the flow direction, which however apply on each of the two turbine units forming this pair when the two turbine units are immersed in a moving liquid.

More specifically, for each symmetrical turbine engine pair of the symmetrical tower pair, the device for holding the turbine engine pair comprises, on the one hand, one or several vertical members arranged symmetrically with respect to plane P1 and/or themselves symmetrical with respect to plane P1 and, on the other hand, one or several plates approximately perpendicular to the rotation axes of the turbine units, arranged on either side of the turbine units along the direction of the rotation axes of the turbine units and supporting the pin joints enabling ensuring the rotation of each turbine unit forming the turbine unit pair.

The present invention applies to any type of cross-flow turbine. More specifically, the present invention applies to cross-flow turbines in which each turbine comprises blades rotating a shaft under the action of lift forces. As an example, the present invention applies to cross-flow turbines of Darrieus type, or Gorlov type (for example, the turbines described in publications "Helical Turbines for the Gulf Stream: Conceptual Approach to Design of a Large-Scale Floating Power Farm" by Gorlov (Marine Technology, vol. 35, n° 3, July 1998, pages 175-182), etc.) or to turbines of the type described in European patent application EP1718863 filed by the Applicant.

Figure 2:
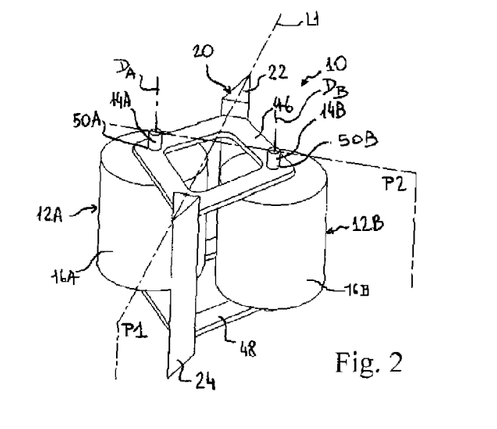
FIG. 2 is a perspective view of an example of a pair of turbine engines according to the present invention.

FIG. 2 is a simplified perspective view of an embodiment of twin turbine engines according to the present invention used to form twin towers. Symmetrical turbine engine pair 10 comprises two cross-flow turbine units 12A, 12B. Each turbine unit 12A, 12B comprises a rotation shaft 14A, 14B of axis $D_A$, $D_B$ and driving means 16A, 16B capable of rotating shaft 14A, 14B. Driving means 16A, 16B are schematically shown as cylinders in FIG. 2. More specifically, each cylinder represents the envelope containing the driving means of a cross-flow turbine unit, the rotation axis of the turbine unit being confounded with the axis of revolution of the cylinder. Axes $D_A$ and $D_B$ of shafts 14A, 14B are substantially parallel. Arrow 18 designates the average velocity vector upstream of the flow of moving liquid in which turbine units 12A and 12B are immersed. As an example, each turbine unit 12A, 12B may have an external diameter ranging from 1 to 10 meters. Planes P1, P2 and line L1 have been shown with dotted lines. In the present example, turbine units 12A and 12B are distributed symmetrically with respect to plane P1.

Symmetrical turbine engine pair 10 comprises a device 20 for holding turbine units 12A and 12B. Holding device 20 is formed two vertical members 22, 24 substantially parallel to axes $D_A$ and $D_B$. Holding device 20 further comprises two substantially parallel plates 46, 48 each having the shape of a diamond, open-worked at its center. Each plate 46, 48 is substantially perpendicular to rotation axes $D_A$ and $D_B$ and is attached to two ends opposite to vertical members 22 and 24 and comprises, at the other opposite ends, two bearings 50A, 50B, in which the ends of shafts 14A, 14B are pivotally assembled to enable the rotation of each turbine unit 12A, 12B immersed in the moving liquid. Turbine units 12A, 12B are thus held within holding device 20 formed of elements 22, 24, 46, and 48. In the present embodiment, vertical member 22 is symmetrical with respect to plane P1 and vertical member 24 is symmetrical with respect to plane P1. However, for turbine engine 10 to be called symmetrical, it is not necessary for vertical member 22 to be symmetrical to vertical member 24 with respect to plane P2. Vertical members 22 and 24 are respectively arranged upstream and downstream of plane P2 with respect to the flow direction. Vertical members 22, 24 have a triangular cross-section with a tip pointing upstream for vertical member 22 and downstream for vertical member 24.

As an example, in top view, turbine unit 12A rotates clockwise and turbine unit 12B rotates counterclockwise. However, turbine unit 12A may rotate counterclockwise and turbine unit 12B may rotate clockwise. According to the rotation directions of turbine units 12A, 12B, driving means 16A and 16B of turbine units 12A and 12B go up or down the flow at the level of median plane P1.

The stress undergone by each turbine unit 12A, 12B when immersed in the moving liquid is comprised of a drag force and of a total lift force at the scale of each turbine unit 12A, 12B. Due to the symmetry relative to plane P1 of holding device 20 immersed in the moving liquid, and to the symmetry relative to the same plane P1 of turbine units 12A, 12B (which rotate in opposite directions), a symmetry of the liquid flow is obtained within the complete symmetrical turbine engine pair 10 formed of holding device 20 and of turbine unit pair 12A, 12B. The symmetry of the flow of moving liquid thus generated within and inside of symmetrical turbine engine pair 10 results in two instantaneous total lift forces applied to turbine units 12A, 12B, of equal intensities and of opposite directions perpendicularly to the direction of the moving liquid upstream of the device. Transmitted within plates 46 and 48, the lift forces generally applied to each turbine unit 12A, 12B add up and cancel at the junction of plates 46 and 48 with vertical members 22 and 24.

Figure 3:
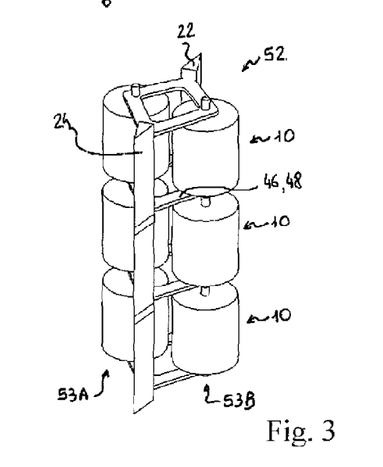
FIG. 3 is a perspective view of an example of twin towers.

FIG. 3 is a perspective view of an embodiment of twin towers 52 which corresponds to a stack of several twin turbine engines 10, the connection between two adjacent twin turbine engines being ensured by vertical members 22, 24. The turbine units are connected to one another to form two adjacent turbine columns 53A, 53B. More specifically, the rotation shafts of two adjacent turbine units along the stacking direction are connected to one another.

To ascertain that the turbine columns rotate in opposite directions, and preferably at the same rotation speed, a possibility is to provide a mechanical system, for example, with gears, connecting the rotation shaft of turbine column 53A to the rotation shaft of turbine column 53B so that the angular positions of the rotation shafts of turbine columns 53A, 53B are permanently connected to each other. Another possibility, when each turbine column 53A, 53B is connected to a generator which is specific thereto, is to control the rotation speed of each turbine column 53A, 53B by the application of a braking torque by the associated generator. The braking torques are then determined so that turbine columns 53A, 53B permanently rotate in opposite directions and at the same rotation speed.

Figure 4:
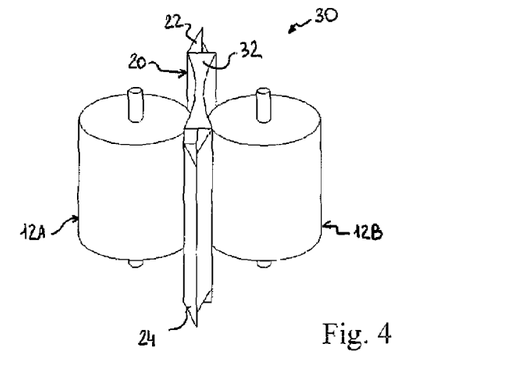
FIGS. 4 to 6 are perspective views of other embodiments of a pair of turbine engines according to the present invention.

FIG. 4 is a simplified perspective view of another embodiment of twin turbine engines 30 according to the present invention, where plates 46, 48 are not shown. As compared with twin turbine engines 10, vertical members 22, 24 are interconnected by an element 32, playing both the role of a screening element by preventing the flowing of fluid between the two turbine units 12A, 12B, and of a strengthening element by improving the flexural rigidity of holding device 20 in plane P1 for a total drag force of direction L1. More specifically, element 32 enables to reject the first normal vibration mode of holding device 20. It further enables to avoid for parasitic flows caused by one of the turbine units to disturb the operation of the other turbine unit. The holding device 20 used to form twin turbine engines 30 may be formed of one and the same mechanical part having its cross-section formed of the reunion of the cross-sections of elements 20, 24, and 32.

Figure 5:
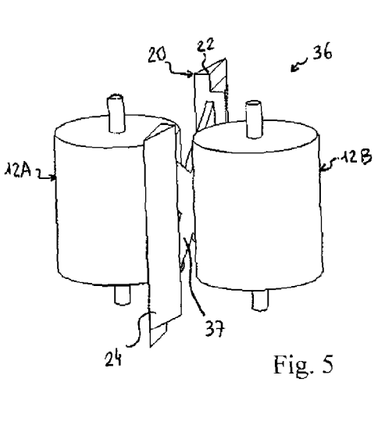

FIG. 5 is a simplified perspective view of another embodiment of a symmetrical turbine engine pair 36 according to the present invention. As compared with symmetrical turbine engine pair 30, vertical members 22, 24 are connected by a cross-shaped stiffening element 37 which improves the rigidity of holding device 20 while still partially screening turbine unit 12A from turbine unit 12B.

Figure 6:
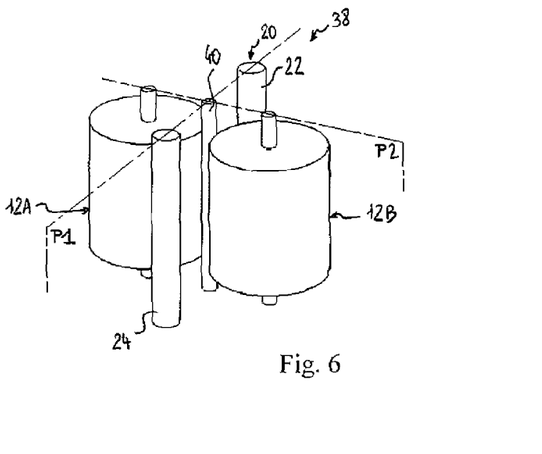

FIG. 6 is a simplified perspective view of another embodiment of a symmetrical turbine engine pair 38 according to the present invention. As compared with symmetrical turbine engine pair 10, vertical members 22 and 24 have a cylindrical cross-section. Holding device 20 further comprises an additional vertical member 40, of cylindrical cross-section, for example arranged along the intersection line of planes P1 and P2. An advantage of using vertical members of circular cross-section over other shapes of vertical member cross-sections is the simplicity of manufacturing and of supply of vertical members of circular cross-section.

Figure 7:
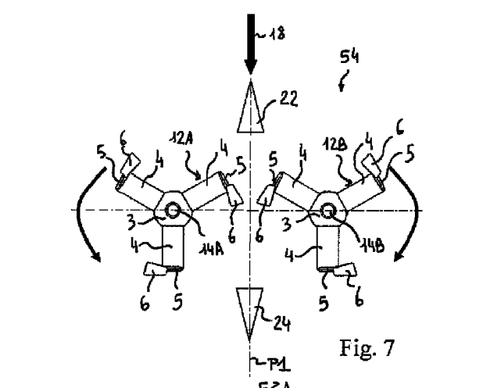
FIGS. 7 and 8 are top views of other examples of turbine engine pairs.
Figure 8:
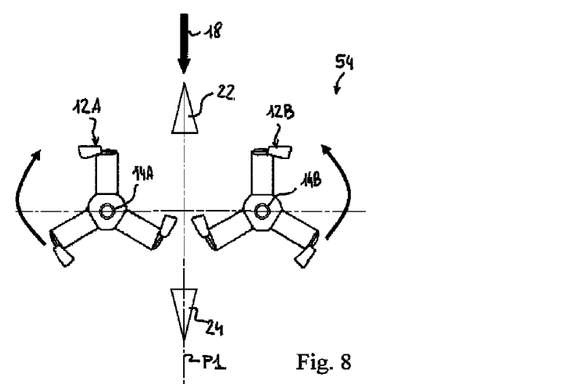

FIGS. 7 and 8 are top views of twin turbine engines 54 in the case where turbine units 12A, 12B correspond to turbine unit 1 shown in FIG. 1, reference 2 designating the rotation shaft of turbine unit 1 in FIG. 1 corresponding to reference numerals 14A and 14B in the other drawings where this type of turbine unit is shown. In FIGS. 7 and 8, turbine units 12A, 12B are arranged symmetrically with respect to plane P1. Further, in FIG. 7, turbine units 12A, 12B are arranged so that turbine unit 12A (to the left of plane P1) rotates counterclockwise and turbine unit 12B (to the right of plane P1) rotates clockwise when the flow has the direction indicated by arrow 18. In FIG. 8, turbine units 12A, 12B are arranged so that turbine unit 12A (to the left of plane P1) rotates clockwise and turbine unit 12B (to the right of plane P1) rotates counterclockwise when the flow has the direction indicated by arrow 18. For FIGS. 7 and 8, during the rotation, turbine units 12A, 12B remain substantially symmetrical to each other with respect to plane P1.

The use of systems for coupling shaft sections of adjacent turbine units of a same turbine column may be required in certain conditions. The use of such couplings requires twin towers for which each turbine unit is located between two plates 46, 48 associated therewith.

Figure 9:
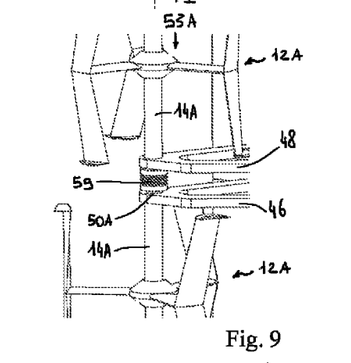
FIGS. 9 and 10 are simplified detail views of examples of connection between two adjacent turbine engines.

FIG. 9 shows an embodiment of a flexible coupling system 59 connecting shafts 14A of two adjacent turbine units 12A of a same turbine column 53A. Flexible coupling system 59 enables to transmit the couple between two adjacent turbine units of a same turbine column while admitting slight misalignments. In FIG. 9, flexible coupling system 59 is arranged between plates 46 and 48.

For hydrodynamic reasons, it may be advantageous to be able to decrease the interval between hubs 3 of two adjacent turbine units 12A, 12B of a same turbine column 53A, 53B.

Figure 10:
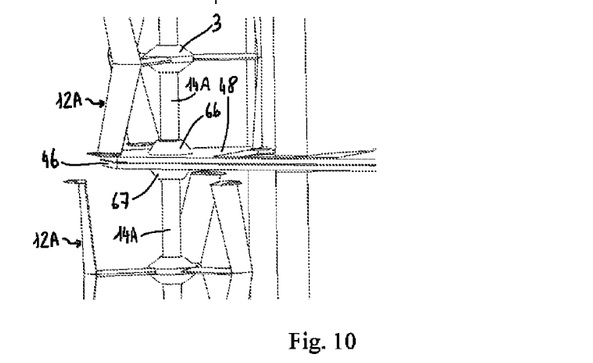

FIG. 10 is a perspective detail view of an embodiment of twin towers for which the interval between hubs 3 of two adjacent turbine units of a same turbine column 53A is decreased with respect to what is shown in FIG. 9. Rotation shaft coupling system 59 is contained within a housing formed of two shells 66, 67 independently attached to each plate 46, 48. Each shell 66, 67 may have a streamline shape in the flow direction. To avoid increasing the degree of indeterminateness of the assembly, this variation enables plates 46 and 48 to be closer to each other without for all this being in contact. Each shell 66, 67 comprises a mechanical component, of pin joint or bearing type, capable of ensuring the rotation of shaft 14A of the corresponding turbine unit 12A. By the placing of dynamic and static seals, a tightness which isolates coupling 59 from the contact with the moving fluid may be provided. As a variation, coupling systems 59 may comprise constant-velocity joints.

Figure 11:
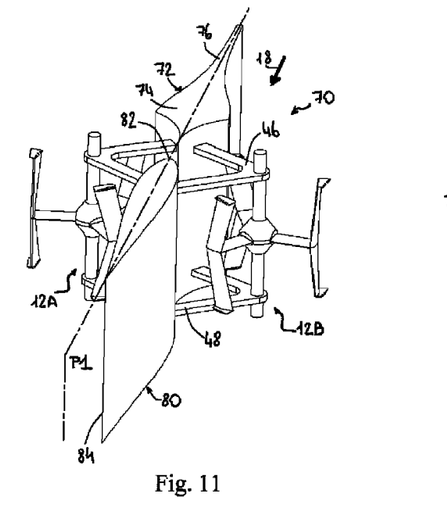
FIG. 11 is a view similar to FIG. 2 of an embodiment of a pair of turbine engines comprising a stem and a tail vane.

FIG. 11 is a view similar to FIG. 2 for another embodiment of twin turbine engines 70. As compared with the embodiment shown in FIG. 2, twin turbine engines 70 comprise a vertical member 72 which is symmetrical with respect to plane P1 and which is arranged upstream of turbine units 12A, 12B with respect to the flow. Vertical member 72 comprises a body 74 which continues in a relatively pointed shape 76 directed upstream. Vertical member 72 then behaves as a stem. The tapered shape of stem 72 especially enables to avoid the accumulation of debris against it. Further, the shape of stem 72 enables to prevent the flow separation at the level of stem 72. Moreover, body 74 provides a protection of turbine units 12A, 12B at the level of plane P1. In particular, when turbine units 12A, 12B are arranged so that foils 5 go up the current alongside plane P1 (configuration inverse to that shown in FIG. 11), stem 72 plays the role of a screen which masks the foils during this upstream motion phase.

Twin turbine engines 70 further comprise a vertical member 80 symmetrical with respect to plane P1 and arranged downstream of turbine units 12A, 12B with respect to the flow. Advantageously, vertical member 80 has a low drag. Vertical member 80 has a foil profile shaped cross-section having its leading edge 82 oriented upstream and its trailing edge 84 oriented downstream. Vertical member 80 plays the role of a tail vane. It especially enables to ease the orientation of twin turbine engines 70 in the flow direction, as will be described hereafter. It also enables to separate the wakes of turbine units 12A, 12B which might interact negatively.

Figure 12:
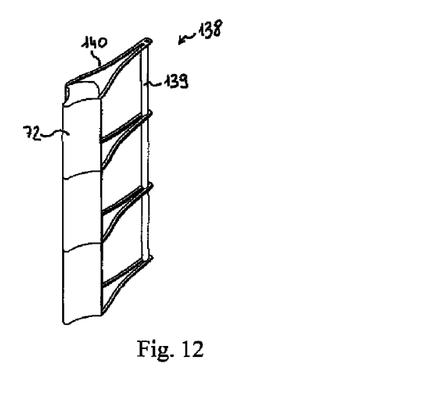
FIG. 12 is a partial view of an embodiment of a stem.

FIG. 12 shows an embodiment of a device 138 comprising a front vertical member 139 connected to stem 72 by spars 140. Front vertical member 139 may play the role of an anti-debris device. As will be described in further detail hereafter, an external anti-debris device may be secured to front vertical member 139. The assembly of stem 72 and of front vertical member 139 of FIG. 12 plays the role of an anti-debris device while avoiding the use of a stem 72 of large dimensions, which might cause a significant drag.

Figure 13:
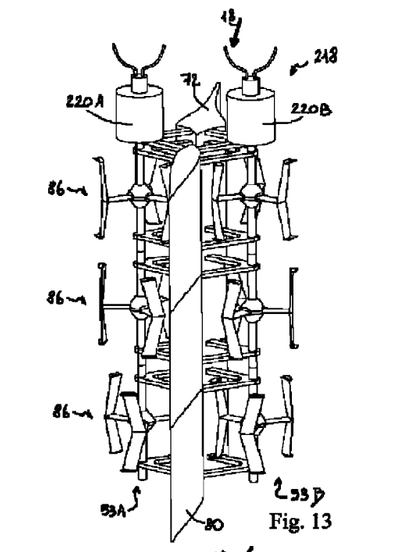
FIGS. 13 and 14 are perspective views of embodiments of twin towers comprising a power generation device.

FIG. 13 shows an embodiment of twin towers 218 formed of the stacking of twin turbine engines having a structure similar to that of twin turbine engines 86 shown in FIG. 11, for which two electric generators 220A, 220B have further been shown. Electric generator 220A is driven by turbine column 53A and electric generator 220B is driven by turbine column 53B. Each electric generator 220A, 220B comprises a speed variation system capable of modifying the ratio between the rotation speed of the shaft of the associated turbine column and the rotation speed of the input shaft of the associated electric generator according to the flow which reaches the turbine column.

Figure 14:
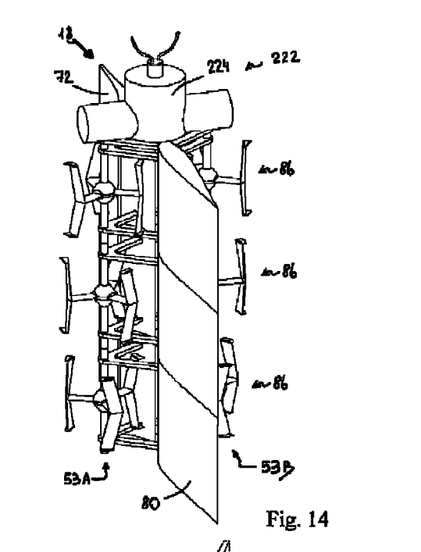

FIG. 14 shows an embodiment of twin towers 222 having a structure similar to that of twin towers 218, but for the fact that it comprises a single electric generator 224 driven by the two turbine columns 53A, 53B. The ends of the rotation shafts of turbine columns 53A, 53B are then connected to a power transmission system, for example, of notched belt or gear type, which drives the input shaft of electric generator 224. The transmission system may further provide the permanent maintaining of the relative angular positions of turbine column 53A with respect to turbine column 53B. Electric generator 224 comprises a speed variation system capable of modifying the ratio between the rotation speeds of the shafts of turbine columns 53A, 53B and the rotation speed of the input shaft of generator 224 according to the flow which reaches turbine columns 53A, 53B.

Electric generators 220A, 220B and 224 may further provide a braking torque, which counters the rotation of turbine columns 53A, 53B, of determined amplitude according to the liquid flow reaching the cross-flow turbine units.

When a single generator 224 is used for the collection and the transformation of the mechanical power provided by each turbine column 53A, 53B, a gear-type power transmission system, especially with bevel gears, may be used, this system also enabling to apply, if necessary for the proper operation of generator 224, a multiplication coefficient between the rotation speed of the turbine columns and the rotation speed of the mechanical shaft located at the generator input. This simple gear system may advantageously be replaced with more complex power transmission systems such as, for example, systems of gear box type, of differential type. Systems of differential type may be particularly advantageous when, where a single electric generator is used, the two turbine columns operate in slightly dissymmetrical fashion and have rotation speeds which are not perfectly synchronized.

In the embodiments shown in FIGS. 13 and 14, electric generators 220A, 220B, and 224 are arranged at the tops of turbine columns 53A, 53B. As a variation, electric generators 220A, 220B, and 224 may be arranged at the base of turbine columns 53A, 53B.

Although examples of twin towers have been described for the conversion of the kinetic energy of sea or river currents into electric power, it should be clear that the present invention may apply to the conversion of the kinetic energy of sea or river currents into other types of power. As an example, the turbine engines according to the present invention may be used to actuate a pumping system or a hydrogen generation system, etc.

Figure 15:
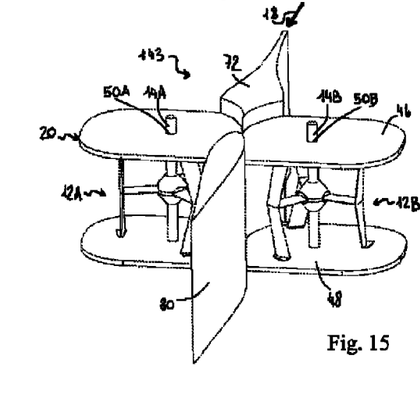
FIGS. 15 and 16 are simplified perspective views of embodiments of a pair of turbine engines comprising a device for decreasing the interactions between adjacent turbine units of a same turbine column.

FIG. 15 is a view similar to FIG. 11 of twin turbine engines 143 in which each plate 46, 48 is formed of a full plate connected, in the present example, to stem 72 and to tail vane 80 and comprising bearings 50A, 50B receiving rotation shafts 14A, 14B of turbine units 12A, 12B. Such an embodiment enables to fully prevent the interactions between two adjacent turbine units of a same turbine column.

Figure 16:
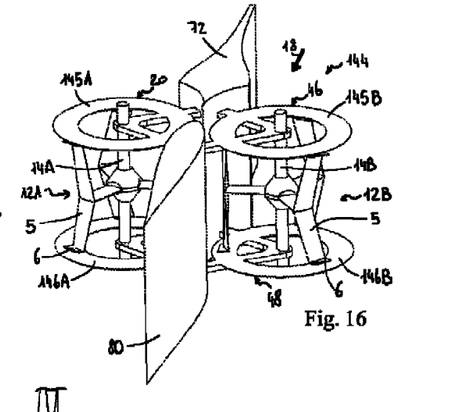

FIG. 16 is a view similar to FIG. 15 of twin turbine engines 144 in which each plate 46, 48 comprises two ring-shaped portions 145A, 145B, 146A, 146B. Each ring-shaped portion is arranged opposite to the ends of foils 5 of turbine units 12A, 12B so that in rotation, each foil tip, possibly comprising a winglet 6, permanently moves close to a ring-shaped portion 145A, 145B, 146A, 146B. Ring-shaped portions 145A, 145B, 146A, 146B enable to decrease the interactions between two adjacent turbine units of a same turbine column and, more specifically, behave as winglets since they favor the interruption of foil tip vortices.

Figure 17:
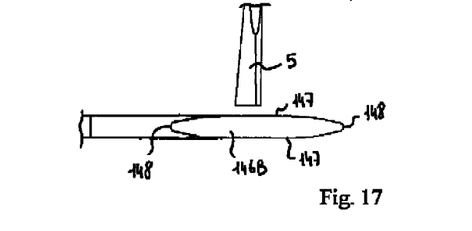
FIG. 17 is a detail view of a variation of the pair of turbine engines of FIG. 16.

FIG. 17 is a partial side cross-section view of ring-shaped portion 146B. The tip of a foil 5 of turbine unit 12B with no winglet 6 has also been shown. Ring-shaped portion 146B may comprise planar surfaces 147, in front of the foil tips of turbine units, which join by curved portions 148. Curved portions 148 are capable of decreasing the drag due to ring-shaped portion 146B along the flow direction.

Figure 18:
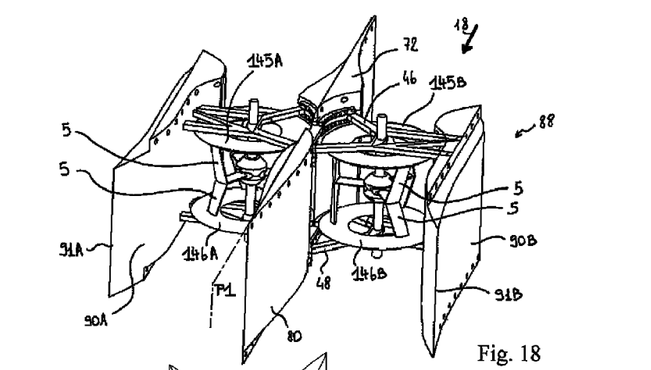
FIG. 18 is a view similar to FIG. 2 of an embodiment of a pair of turbine engines comprising a stem, a tail vane, and lateral vertical members.

FIG. 18 is a view similar to FIG. 11 of twin turbine engines 88 comprising, in addition to stem 72 and tail vane 80, two lateral vertical members 90A, 90B attached to plates 46, 48. Lateral vertical members 90A, 90B are arranged symmetrically with respect to plane P1 and provide a confinement of the flow at the level of each turbine unit 12A, 12B along with stem 72 and tail vane 80. The flow is confined all the way to turbine units 12A, 12B. Beyond each turbine unit 12A, 12B, the flow engages into a diverging portion obtained by the increasing distance of lateral vertical members 90A, 90B from plane P1 all the way to their trailing edge 91A, 91B. As an example, for each turbine unit 12A, 12B, the tips of foils 5 are in front of one of ring-shaped portions 145A, 145B, 146A, 146B. In this example, for each turbine unit 12A, 12B, the converging portion upstream of turbine unit 12A, 12B partially masks a given area of turbine unit 12A, 12B close to lateral vertical member 90A, 90B from the incident flow. For this reason, the rotation direction of turbine units 12A, 12B may be inverted with respect to what is shown in FIG. 18.

Figure 19:
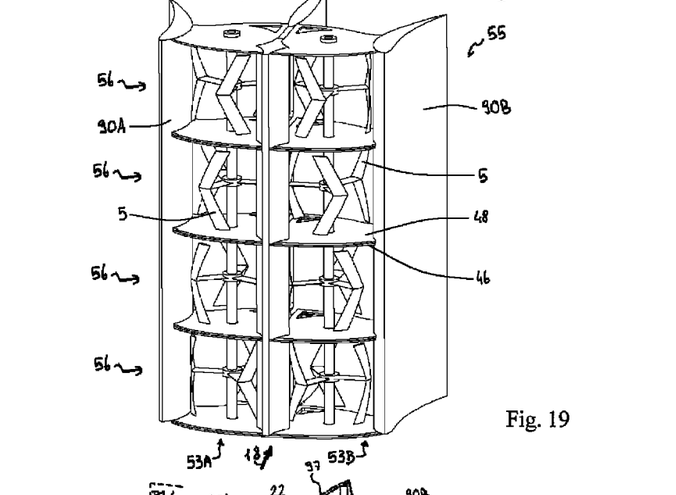
FIGS. 19 and 20 are simplified perspective views of embodiments of twin towers having their pairs of turbine engines comprising a stem, a tail vane, and lateral vertical members.

FIG. 19 shows an embodiment of twin towers 55 corresponding to a stack of twin turbine engines 56 similar to twin turbine engines 88, where the turbine units correspond to turbine unit 1 shown in FIG. 1. For twin towers 55, foils 5 of a turbine unit 12A, 12B are angularly offset with respect to the foils of an adjacent turbine unit of the same turbine column 53A, 53B along the stacking direction, for example, by a 40° angle. As an example, for each turbine unit 12A, 12B, the tips of foils 5 are in front of plates 46, 48 formed of full plates as shown in FIG. 15. Vertical members 90A, 90B are tangent to turbine units 12A, 12B without for all this being symmetrical with respect to plane P2. Lateral vertical members 90A, 90B then do not mask turbine units 12A, 12B. The width cleared by the internal profile of vertical member 90A, 90B then abruptly decreases as it is drawn closer to turbine unit 12A, 12B, along the internal flow direction, close to which it keeps a constant value, after which, downstream of turbine unit 12A, 12B, the width gradually increases to form a sort of divergent section. Such lateral vertical members may thus have the shape of a foil of NACA, Eppler, Wortman, etc. type, possibly with a strong camber. The fact for vertical members 90A, 90B to strongly draw away from each other downstream of turbine units 12A, 12B enables to increase the liquid cross-section seen by twin turbine engines 55. This configuration, like that of FIG. 18, is more adapted to a one-way current.

Figure 20:
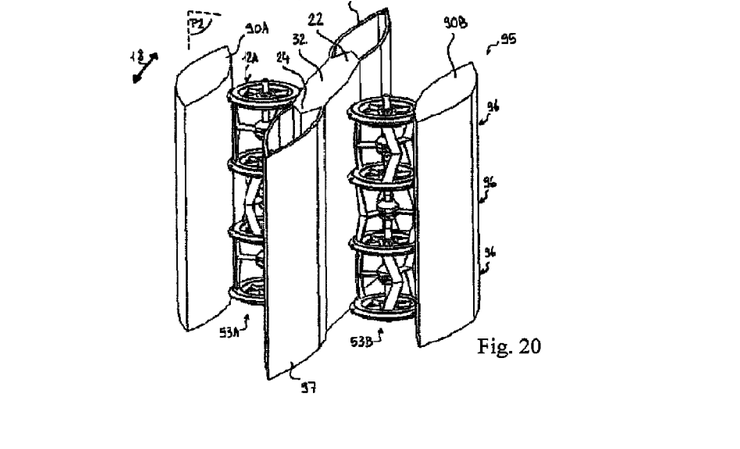

FIG. 20 shows an example of twin towers 95 formed of the stacking of twin turbine engines 96 for which vertical members 22, 24 and element 32 are a single piece, twin turbine engines 96 further comprising lateral vertical members 90A, 90B like for twin turbine engines 88 shown in FIG. 18. Further, lateral vertical member 90A, lateral vertical member 90B, and vertical member 24 are each symmetrical with respect to plane P2. Therefore, each of twin turbine engines 96 may operate identically for opposite currents keeping a substantially constant direction (such is the case, for example, for tidal currents). In the example of FIG. 20, vertical members 22, 24 are continued by hollow structures 97 which play the role of a stem and of a tail vane. Further, lateral vertical members 90A, 90B and element 32 are substantially tangent to turbine units 12A, 12B while being symmetrical with respect to plane P2. The width cleared by the internal profile of vertical member 90A, 90B then gradually decreases as it is drawn closer to turbine unit 12A, 12B, close to which it keeps a constant value, after which, downstream of turbine unit 12A, 12B, the width increases, as specified hereabove, to form a sort of regular convergent-divergent passage.

Figure 21:
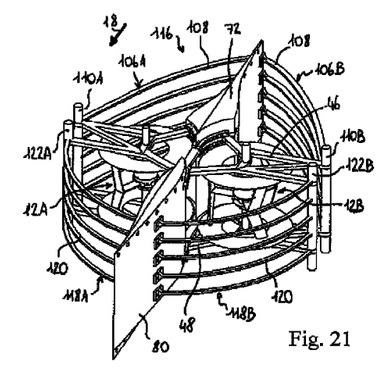
FIGS. 21 to 23 are simplified perspective views of embodiments of pairs of turbine engines comprising an anti-debris device and regulating the current upstream and/or downstream of the pair of turbine engines.

FIG. 21 is a view similar to FIG. 11 of twin turbine engines 116 comprising, in addition to stem 72 and tail vane 80, an upstream anti-debris device 106A, 106B and a downstream anti-debris device 118A, 118B for each turbine unit 12A, 12B. Each upstream anti-debris device 106A, 106B comprises parallel rods 108 extending upstream of a turbine unit 12A, 12B, an end of each rod being attached to stem 72 and its opposite end being attached to a vertical member 110A, 110B, vertical members 110A, 110B being attached to plates 46, 48. Rods 108 have a curved shape to ease the tilting and sliding of debris to improve the debris removal. Further, rods 108 enable to regulate the flow. Protection grids may be attached to upstream anti-debris devices 106A, 106B to avoid, for example, for fish to come into contact with turbine units 12A, 12B. As a variation, rods 108 may be replaced with curved tubes. Each downstream anti-debris device 118A, 118B comprises parallel rods 120 extending downstream of a turbine unit 12A, 12B, one end of each rod being attached to tail vane 80 and its opposite end being attached to a vertical member 122A, 122B, vertical members 122A, 122B being attached to plates 46, 48. Downstream anti-debris devices 118A, 118B enable to avoid for debrises to reach turbine units 12A, 12B from downstream, in particular in the case of light currents. They also enable to regulate the current downstream of symmetrical turbine engine pair 116, which may be advantageous, in particular when another symmetrical turbine engine pair is arranged downstream. Further, as will be described hereafter, a device enabling to rotate the entire symmetrical turbine engine pair around an axis parallel to rotation axes $D_A$ and $D_B$ may be provided. This may be advantageous, for example, to directly clean upstream anti-debris devices 106A, 106B with the flow by rotating the twin turbine engines by more than some hundred degrees. In this case, downstream anti-debris devices 118A, 118B play the role of upstream anti-debris devices 106A, 106B during the cleaning phase.

Figure 22:
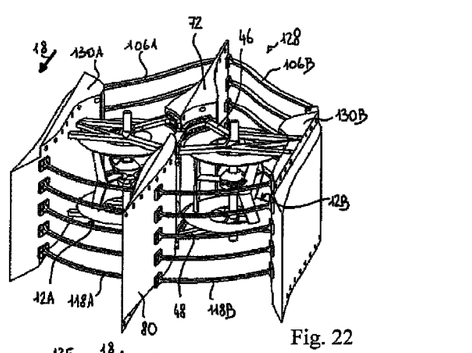

FIG. 22 is a view similar to FIG. 21 of twin turbine engines 128 in which lateral vertical members 110A, 110B, 122A, 122B are replaced with vertical members 130A, 130B which substantially have the shape of lateral vertical members 90A, 90B of turbine engine 88 shown in FIG. 18. As compared with upstream anti-debris device 106A, 106B shown in FIG. 21, upstream anti-debris devices 106A, 106B shown in FIG. 22 have a more pointed shape at the level of stem 72. This decreases the risk for debris to get caught and eases the debris removal. As a variation, it is possible for lateral vertical members 130A, 130B not to be directly connected to plates 46, 48 but only to anti-debris devices 106A, 106B, 118A, 118B.

Figure 23:
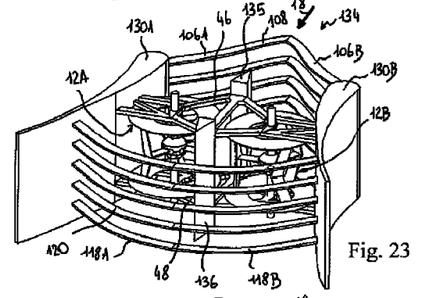

FIG. 23 is a view similar to FIG. 21 of twin turbine engines 134 in which stem 72 and tail vane 80 are replaced with vertical members 135, 136 having the shape of vertical members 22, 24 of the twin turbine engines 10 shown in FIG. 2. Rods 108 of upstream anti-debris devices 106A, 106B are interconnected and are then only attached to vertical members 130A, 130B at their ends. Similarly, rods 120 of downstream anti-debris devices 118A, 118B are interconnected and are then only attached to vertical members 130A, 130B at their ends. As a variation, vertical members 135 and 136 may be omitted. The mechanical hold of the turbine engine is then provided by lateral vertical members 130A, 130B. This enables to use the twin towers independently from the rotation direction of turbine units 12A, 12B. For FIG. 23, vertical members 130A, 130B do not mask turbine units 12A, 12B as in FIG. 22 and are arranged so that the width cleared by vertical members 130A, 130B gradually increases, downstream of turbine unit 12A, 12B, to form a kind of divergent section. The fact for vertical members 130A, 130B to be strongly drawn away from each other downstream of turbine units 12A, 12B enables to increase the liquid cross-section seen by twin turbine engines 134. The lateral vertical members can thus each have the shape of a foil, as shown in FIG. 19.

Figure 24:
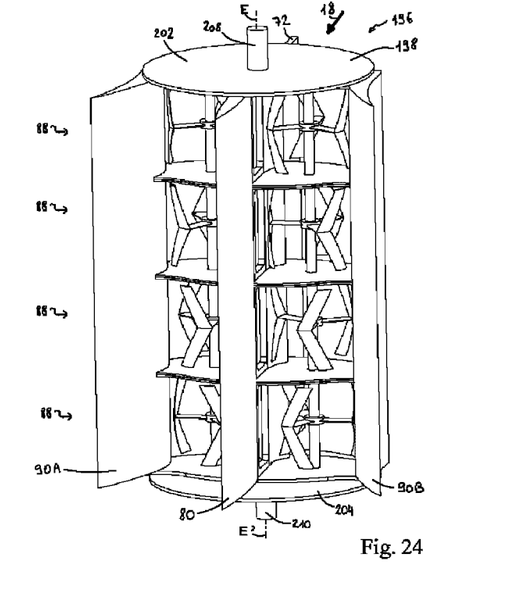
FIG. 24 is a perspective view of an embodiment of twin towers comprising a device of general orientation of the twin towers with respect to the ground.

FIG. 24 is a perspective view of an embodiment of twin towers 196, corresponding to the stacking of twin turbine engines 88 such as shown in FIG. 19, for which a device 198 for positioning the towers has been shown. As an example, for each pair of twin turbine engines forming twin towers 196, planes P1 and P2 are considered to be vertical. Positioning device 198 comprises an upper platform 202 having the shape of a disk in the present embodiment, to which is attached the device for holding twin turbine engines located at the top of the twin towers. Twin towers 196 comprise a lower platform 204, having the shape of a disk in the present embodiment, to which is attached the device for holding the twin turbine engines located at the base of the twin towers. A shaft portion 208 of axis E projects upwards from platform 202 and a shaft portion 210 of axis E' projects downwards from platform 204. Shaft portion 210 may be assembled to freely rotate at the level of a lower container, not shown, fixed with respect to the ground. Shaft portion 208 may also be assembled to freely rotate at the level of an upper container, not shown, which is itself for example connected to the ground by beams or cables, not shown. Axes E and E' are confounded to enable the assembly of twin towers 196 to rotate with respect to the ground. As a variation, only lower platform 204 may be present.

The rotating of twin towers 196 may be provided without power assistance via tail vanes 80 of the twin turbine engines which naturally tend to maintain line L1 parallel to the upstream current direction. It can thus be provided to let twin towers 196 rotate to maintain line L1 parallel to the upstream current if said current is variable. The autorotation may also be provided by placing rotation axis E or E' upstream of the two resultants of forces each exerted on the lateral vertical members and which do not pass their respective thrust centers. In the case where the twin turbine engines forming the twin towers are provided with upstream anti-debris devices 106A, 106B, it may also be provided to rotate the twin towers to ease the cleaning of upstream anti-debris devices 106A, 106B.

Figure 25:
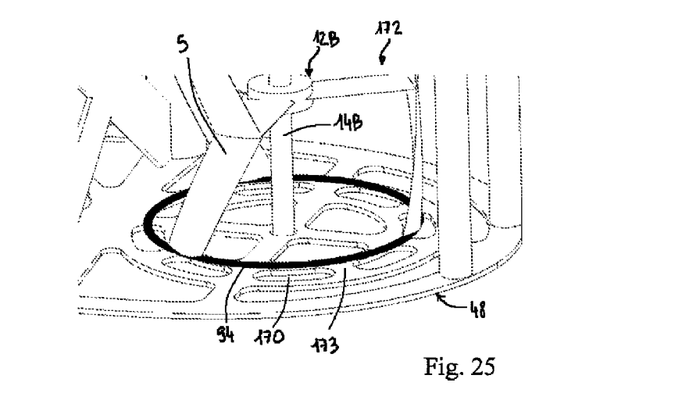
FIG. 25 is a perspective detail view of an embodiment of a pair of turbine engines comprising a device for preventing the forming of tip vortices.

FIG. 25 is a perspective detail view of an embodiment of twin turbine engines 172 provided with plates 46 and 48 which have the same shape as the plates shown in FIG. 15, but for the fact that they may be open-worked. Openings 170 are then distributed, for example, evenly, in each plate 46 and 48. The tips of foils 5 located on a same side of a turbine unit may be connected by a ring 94, shown in black in FIG. 25. Rings 94 are arranged in front of some of openings 170, which enables to decrease the hydraulic friction as rings 94 are running past while decreasing the interactions between two adjacent turbine units of a same turbine column. An interval 173 is provided between rings 94 of turbine units 12B and the corresponding plate 48. It may be advantageous for the cross-section of such a ring 94 to be small so that its width only slightly exceeds the thickness of a blade 5. Ring 94 is than called a wire ring. On such a wire ring, it is also possible to graft winglets at the sole tips of blades 5, such winglets thus forming local enlargements of the initial wire ring. Rings 94 enable to improve the strength of turbine unit 12B against the fatigue due to cyclic flexural stress. Generally, turbine units 12A, 12B provided with rings 94 may be used with any type of plates 46, 48, that is, plates corresponding to full plates, possibly open-worked, to diamond-shaped plates, to plates comprising a ring-shaped portion in front of rings 94, etc.

Figure 26:
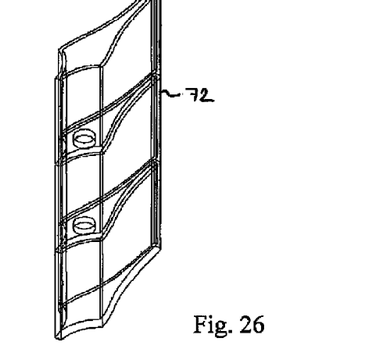
FIG. 26 is a perspective view of an example of the internal structure of a vertical member.

FIG. 26 shows an embodiment of stem 72 in which stem 72 forms a hollow tank capable of being at least partly filled with liquid. This eases the mounting/dismounting of the twin towers. The turbine engine then comprises remotely operable means capable, when the tank is immersed in the liquid, of at least partially filling the tank with liquid and/or of at least partially emptying the tank. The previous example relating to hollow stem 72 may apply to the other types of previously-described vertical members (tail vane 80, lateral vertical members 90A, 90B, 130A, 130B).

When an incident flow reaches twin turbine engines, it divides into internal or axial flows, which drive the turbine units, and into external flows which go round the twin turbine engines.

Figure 27:
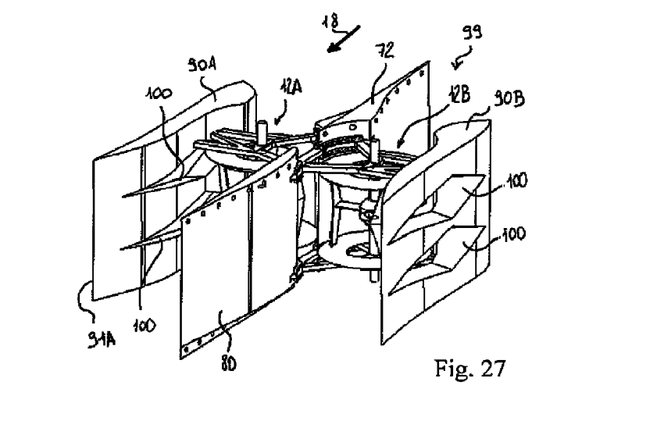
FIG. 27 is a simplified perspective view of an embodiment of a pair of turbine engines comprising a stem, a tail vane, and lateral vertical members provided with slots.

FIG. 27 is a simplified perspective view of another embodiment of a symmetrical turbine engine pair 99 according to the present invention. As compared with the twin turbine engines 88 shown in FIG. 18, lateral vertical members 90A, 90B of twin turbine engines 99 are each crossed by slots 100 to enable cross-flows between the flows external to vertical members 90A, 90B and the incident internal flows which rotate each turbine unit 12A, 12B. Such cross-flows originate from the external flows and join the internal flows. They form through slots 100 from each turbine unit 12A, 12B and all the way to the rear edges of slots 100. There should preferably be no slot in front of the turbine unit areas where the systems for connecting the blades to the turbine unit rotation shaft are located, to avoid for cross-flows to increase the drag force on such connection systems. It may thus be advantageous to provide two slots 100 separating a central portion 101 of vertical member 90B masking the portion of turbine unit 12B where arms 4 of turbine unit 12B are located. Instead of two slots 100, a higher even number of slots 100 may be envisaged.

Thus, for each of turbine units 12A, 12B, the described pressure difference is decreased by modification of the thickness of slot 100 and cavitation risks are decreased. The axial flow downstream of twin turbine engines 99 is regulated, which especially provides a less agitated junction of the internal and external flows downstream of trailing edges 91A, 91B of lateral vertical members 90A, 90B. Finally, in the area of vertical members 90A, 90B close to the axial flow where, in the absence of slot 100, blades 5 transmit to shaft 2 of turbine unit 12A, 12B a torque which is either slightly driving or resistive, the presence of slot 100 introduces an additional flow affecting the internal boundary layer which develops on the lateral vertical members and which may locally generate a drive torque and contribute to the improvement of the general efficiency of turbine unit 12A, 12B.

When the sea or river site crossed by a current is very large, several twin towers may be assembled to form a flotilla. A good distribution of the twin towers of the flotilla enables to optimize the power recovered at the level of each symmetrical tower pair.

Specific embodiments of the present invention have been described. Various alterations and modifications will occur to those skilled in the art. In particular, certain aspects previously described in specific embodiments may be combined with other embodiments. As an example, platforms 202, 204 shown in FIG. 24 may be provided at the level of the twin towers shown in FIGS. 19 and 20. Further, although the present invention has been described for twin turbine engines comprising two cross-flow turbines, with separate parallel axes and rotating in opposite directions, it should be clear that the present invention also applies to a turbine engine comprising an even number of turbines with separate parallel axes held by a single holding device, half of the turbines rotating in one direction and the other half of the turbines rotating in the opposite direction.

The invention claimed is:

1. A turbine engine (52; 55) comprising:
at least first, second, third, and fourth lift-type cross-flow water turbines (12A, 12B), the first turbine (12A) comprising a first rotation shaft (14A), the second turbine (12B) comprising a second rotation shaft (14B), the first and second turbines being symmetrical to each other with respect to a plane (P1), the third turbine comprising a third rotation shaft connected to the first rotation shaft by a first coupling device (59) capable of compensating for spatial misalignments between the first and third rotation shafts, the third turbine forming, with the first turbine, a first stack of turbines (53A), the fourth turbine comprising a fourth rotation shaft connected to the second rotation shaft by a second coupling device (59) capable of compensating for spatial misalignments between the second and fourth rotation shafts, the third and fourth turbines being symmetrical to each other with respect to said plane, the fourth turbine forming, with the second turbine, a second stack of turbines (53B);

a device (20) for holding the first and second turbine stacks, comprising a single vertical member symmetrical with respect to said plane (P1) or vertical members (22, 24), each of said vertical members being symmetrical with respect to said plane and/or said vertical members being arranged symmetrically with respect to said plane, the holding device further comprising first and second plates (46, 48) symmetrical with respect to said plane, at least partly perpendicular to said plane, attached to the vertical members and arranged between the first and third turbines and between the second and fourth turbines, the first and second rotation shafts being pivotally connected to the first plate and the third and fourth rotation shafts being pivotally connected to the second plate; and a control device (220A, 220B, 224) capable of permanently maintaining the symmetry between the first and second turbine stacks with respect to said plane and of maintaining the rotation speeds of the first and second turbine stacks of equal values and of opposite rotation directions when the first and second turbine stacks are immersed in a moving liquid.

2. The turbine engine of claim 1, wherein at least one vertical member (72) symmetrical with respect to said plane (P1) extends upstream of the first and second turbine stacks (53A, 53B) with respect to the liquid flow direction and forms a stem, wherein the first turbine (12A) comprises first blades (5) connected to the first rotation shaft (14A), wherein the second turbine (12B) comprises second blades (5) connected to the second rotation shaft (14B), wherein the third turbine comprises third blades connected to the third rotation shaft, wherein the fourth turbine comprises fourth blades connected to the fourth rotation shaft, and wherein the control device (220A, 220B, 224) is capable of rotating the first, second, third, and fourth turbines so that the first, second, third, and fourth blades go up the flow of said liquid when they are closest to said plane.

3. The turbine engine of claim 1, wherein at least one vertical member (80) extends downstream of the first and second turbine stacks with respect to the liquid flow direction and forms a tail vane.

4. The turbine engine of claim 1, wherein the first and second turbine stacks (53A, 53B) are capable of driving an input shaft of a single power recovery system (224) via a transmission device or wherein the first turbine stack (53A) is capable of driving an input shaft of a first power recovery system (220A), the second turbine stack (53B) being capable of driving an input shaft of a second power recovery system (220B).

5. The turbine engine of claim 1, comprising at least two lateral vertical members (90A, 90B; 130A, 130B) arranged symmetrically with respect to said plane (P1) and forming at least one divergent section along the flow direction, the first and second turbine stacks (53A, 53B) being arranged between the lateral vertical members.

6. The turbine engine of claim 1, wherein the first and second plates (46, 48) are capable of separating the moving liquid between the first and third turbines (12A) and between the second and fourth turbines (12B), wherein at least the first turbine (12A) comprises first blades (5) connected to the first rotation shaft (14A) and wherein the holding device (20) comprises at least one portion (145A, 145B) arranged in front of first tips of the first blades (5).

7. The turbine engine of claim 1, comprising an anti-debris device (106A, 106B; 118A, 118B) comprising parallel bars and/or rods (108; 120) connected to at least one vertical member (72, 80) and at least partially surrounding the first and second turbine stacks (53A, 53B).

8. The turbine engine of claim 1, comprising a system (198) capable of pivoting or of letting pivot the first and second turbine stacks (53A, 53B) in the moving liquid.

9. The turbine engine of claim 1, wherein at least the first turbine (12A) comprises first blades (5) connected to the first rotation shaft (14A) and wherein the ends of the first blades (5) are connected by a first ring (94) rotating along with the first blades.

10. The turbine engine of claim 1, wherein the first turbine (12A) comprises first blades (5) connected to the first rotation shaft (14A), wherein the second turbine (12B) comprises second blades (5) connected to the second rotation shaft (14B), wherein the third turbine comprises third blades connected to the third rotation shaft, wherein the fourth turbine comprises fourth blades connected to the fourth rotation shaft, the first blades being symmetrical to the second blades with respect to said plane (P1), the third blades being symmetrical to the fourth blades with respect to said plane (P1), and wherein the first blades are, in top view, angularly offset with respect to the third blades.

11. The turbine engine of claim 5, wherein at least one of the lateral vertical members (90A, 90B) comprises at least one slot (100) extending along the liquid flow direction.

* * * * *